June 7, 1966 — C. MEISLOHN — 3,255,284
PROCESS OF CURING GARDEN HOSE
Filed Jan. 15, 1965
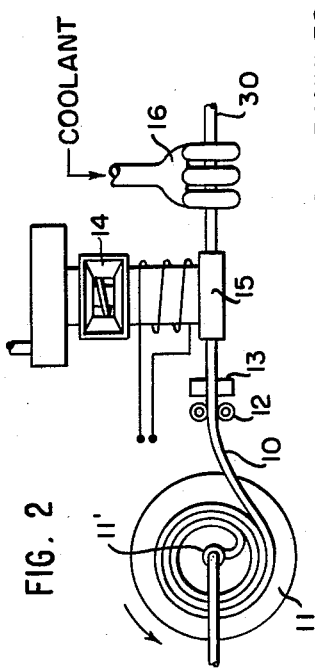
FIG. 2
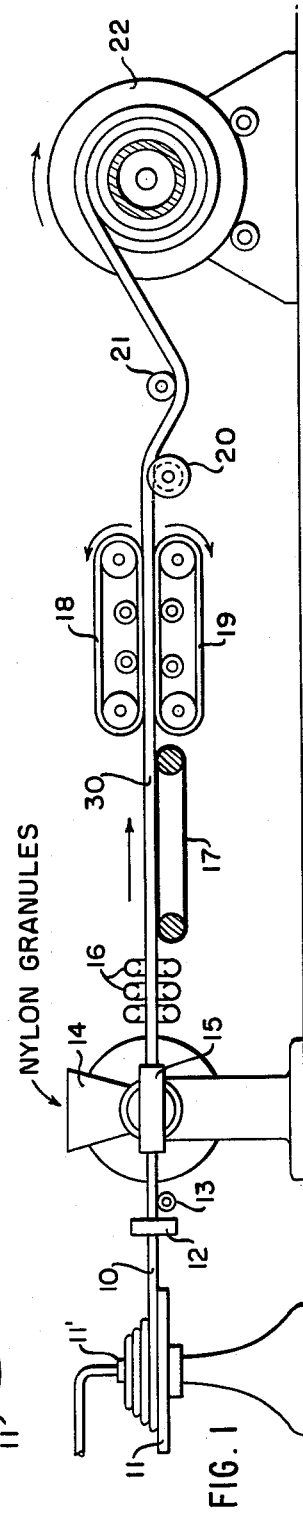
FIG. 1
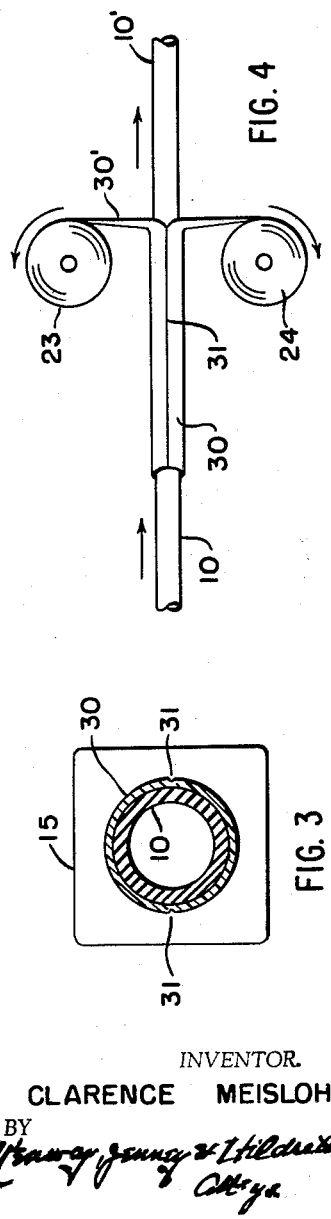
FIG. 4
FIG. 3
INVENTOR.
CLARENCE MEISLOHN 3,255,284
PROCESS OF CURING GARDEN HOSE
Clarence Meislohn, Hohenwald, Tenn., assignor to American Biltrite Rubber Co., Inc., Chelsea, Mass., a corporation of Delaware
Filed Jan. 15, 1965, Ser. No. 425,718
7 Claims. (Cl. 264—95)

This invention relates to the production of rubberized hose or tubing and comprises a new and improved process of manufacture characterized by the employment of a sheath of nylon or other suitable high melting synthetic polyamide as an external mold in effecting the surface finishing, curing or vulcanizing steps.

It has been the practice heretofore to vulcanize rubberized hose while enclosed in a continuous sheath of lead which also imparts a mold finish to the product. While the results of this known process are satisfactory it is expensive and very cumbersome, requiring as it does the handling of a great weight of lead, the difficulty in stripping a solid lead sheath from the cured product and objectionable waste in re-use of the metal.

I have discovered that all the desirable results incident to the employment of a lead sheath are attained by shrinking upon the uncured hose a non-metallic sheath of nylon or the like and that other and important advantages flow from this new departure in the industry. In the first place the weight of the sheath material required is greatly reduced, the effective thickness of the sheath may be substantially reduced, the molten nylon may be conveniently handled at a lower temperature than lead, the nylon sheath may be more readily stripped from the finished product than lead and more readily adapted for re-use all at substantially less waste.

These and other features and advantages of my improved process will be best understood and appreciated from the following description of an illustrative example of its practice as suggested in the accompanying drawings in which:

FIG. 1 is a diagrammatic view of apparatus for carrying out the process,

FIG. 2 is a fragmentary plan view thereof,

FIG. 3 is a sectional view showing the coated hose as emerging from a bath of molten nylon, and FIG. 4 is a view showing the step of stripping the nylon sheath from the cured hose.

The process is hereby shown as carried out in the manufacture of rubberized hose that is vulcanized under conditions of heat and pressure after being constructed on a mandrel in the usual manner or by extrusion.

The unvulcanized hose 10 is drawn from a coil placed upon a circular stand 11 and maintained under internal pressure by compressed air at about 90 p.s.i. through connections 11'. Alternatively the necessary internal support may be derived by retaining each successive length of hose upon its mandrel.

The internally supported hose is drawn through guide rolls 12 and 13 to and through a reservoir of molten nylon contained in an electrically heated casing 15 which is supplied with nylon in granular condition from a hopper 14. In the casing 15 is formed a chamber for the molten nylon through which the uncured hose is passed and this chamber merges into the circular extruding die shown in cross section in FIG. 3.

As the coated hose leaves the casing 15 it is conducted through cooling coils 16 in which the molten nylon coating is converted into a solid nylon sheath 30. In this stage the nylon sheath contracts powerfully, imparting a smooth ironed finish to the unvulcanized hose enclosed within it. The molten nylon may be heated at a temperature of 400°–450° F. and emerge from the cooling coils as a sheath upon the hose perhaps 0.01 to 0.05" in thickness.

The sheathed hose is then conducted along an extended cooling path during which the sheath still further contracts upon the hose while a substantial internal pressure is maintained within it. The sheathed hose may be continuously advanced through the die and along its cooling path at a rate of approximately 100 feet per minute.

As herein shown the sheathed hose is picked up by a conveyor belt 17 upon leaving the cooling coils 16 and drawn toward the right by feeding belts 18 and 19 which engage the hose between them. The hose then passes over a guide roll 20, under a dancer roll 21 to a stand 22 where it is wound in coils of convenient length. These lengths of hose, enclosed within their nylon sheaths, may now be cured or vulcanized at any convenient time by conventional treatment.

At the outlet end of the casing 15 the die opening is shaped to cause the sheath to emerge with a pair of longitudinal grooves 31 formed in its opposite walls. The sheath may be reduced to 0.02" beneath these grooves and so easily split and removed from the now-vulcanized hose. As shown in FIG. 4 the sheath is split at opposite sides along the grooves 31 thus providing a pair of bands 31' that may be temporarily wound upon reels 23 and 24. From these they may be removed, dried and granulated for re-use in the manner described above. Meanwhile the vulcanized hose 10' is ready for storage or shipment.

The term "nylon" is used herein as in terms of the trade to designate any suitable high melting point synthetic polyamide having a relative sharp melting point and a high coefficient of thermal shrinkage on solidification from molten condition.

Having thus disclosed my invention and described in detail an illustrative manner of putting it into practice, I claim as new and desire to secure by Letters Patent:

1. The process of making hose which comprises the steps of progressively passing an internally supported and uncured hose through a bath of molten nylon and then through a cooling zone thereby shrinking a solid nylon sheath upon the uncured hose, and then subjecting the nylon-sheathed hose to curing temperature while held compressed within its nylon sheath.

2. The process defined in claim 1, further characterized in that longitudinal grooves are formed in the nylon sheath as it is cured and solidified upon the hose.

3. The process of making rubberized hose comprising the steps of advancing an uncured hose through a bath of molten nylon preparatory to shrinking a solid sheath of nylon on the hose, and then advancing the nylon-sheathed hose through an extended cooling path and thereby effecting further shrinking of the nylon sheath upon the encased hose, and subsequently vulcanizing the hose while so encased.

4. The process of making rubberized hose as defined in claim 3, further characterized in that the nylon encased hose is vulcanized while internally supported by a mandrel.

5. The process of making rubberized hose as defined in claim 3, further characterized in that the hose is supported by internal fluid pressure while the nylon sheath is being shrunk upon it.

6. The process of making hose from curable elastomeric material, which includes the steps of forming a bath of molten nylon adjacent to an extruding die, coating a length of uncured elastomeric hose with molten nylon by drawing it through the said bath and out through the extruding die, immediately chilling the coated hose to solidify and shrink the nylon coating to a solid nylon sheath, and then curing the hose by subjecting it to heat and internal pressure while encased within the solid nylon sheath.

7. The process defined in claim 6, further characterized by the step of removing the solid nylon sheath from the cured hose and re-melting the solid nylon thus removed for re-use in the process.

References Cited by the Examiner

UNITED STATES PATENTS

| | | | |
|---|---|---|---|
| 1,622,340 | 3/1927 | Paeplow | 264—166 |
| 2,301,207 | 11/1942 | Garretson | 264—166 |
| 2,444,903 | 7/1948 | Van Buren. | |
| 2,538,406 | 1/1951 | Allen | 264—166 |
| 2,611,153 | 9/1952 | Semegen | 264—129 |
| 2,624,073 | 1/1953 | Pugh | 264—173 |
| 2,626,428 | 1/1953 | Stahl | 264—129 |
| 2,933,526 | 7/1961 | Young | 156—155 |
| 3,015,133 | 1/1962 | Nichols | 264—173 |

ROBERT F. WHITE, *Primary Examiner.*

R. B. MOFFITT, *Assistant Examiner.*